(12) United States Patent
Honda et al.

(10) Patent No.: US 10,054,126 B2
(45) Date of Patent: Aug. 21, 2018

(54) CASING AND BLOWER

(71) Applicant: Nidec Corporation, Kyoto (JP)

(72) Inventors: Takeshi Honda, Kyoto (JP); Tadaaki Fujinaga, Kyoto (JP); Haruo Michishita, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 871 days.

(21) Appl. No.: 14/557,633

(22) Filed: Dec. 2, 2014

(65) Prior Publication Data

US 2015/0322963 A1 Nov. 12, 2015

(30) Foreign Application Priority Data

May 7, 2014 (JP) .................................. 2014-096357

(51) Int. Cl.
*F04D 29/42* (2006.01)
*F04D 25/06* (2006.01)
*F04D 17/08* (2006.01)
*F04D 25/02* (2006.01)
*F04D 29/28* (2006.01)
(Continued)

(52) U.S. Cl.
CPC ......... *F04D 25/0613* (2013.01); *F04D 17/08* (2013.01); *F04D 25/02* (2013.01); *F04D 29/023* (2013.01); *F04D 29/281* (2013.01); *F04D 29/4226* (2013.01); *F04D 29/646* (2013.01); *G06F 1/203* (2013.01);
(Continued)

(58) Field of Classification Search
CPC .... F04D 29/4226; F04D 29/40; F04D 29/403; F04D 29/42; F04D 25/0613
See application file for complete search history.

(56) References Cited

U.S. PATENT DOCUMENTS 6,049,455 A * 4/2000 Nakamura .............. G06F 1/203
165/80.3
6,525,441 B2 2/2003 Yamaguchi
(Continued)

FOREIGN PATENT DOCUMENTS

JP 05-096531 U 12/1993
JP 07-036586 U 7/1995
(Continued)

OTHER PUBLICATIONS

Honda et al., "Motor and Blower," U.S. Appl. No. 14/557,636, filed Dec. 2, 2014.

*Primary Examiner* — Richard Edgar
*Assistant Examiner* — Michael Sehn
(74) *Attorney, Agent, or Firm* — Keating & Bennett, LLP

(57) ABSTRACT

A casing includes a first plate made of a metal, a support made of a resin, and a second plate fixed to the support. The first plate includes a flat plate portion, a through hole passing through the flat plate portion, and a claw portion extending upward from an edge of the through hole. A portion of the support is located in the through hole. The support covers a portion of the claw portion such that the support is prevented from turning and from coming off in an upward direction. The claw portion is defined by a portion of the first plate extending along a longest line segment inside the through hole in a plan view being bent upward from the flat plate portion. This enables the claw portion to have a great length even in a small area of the first plate to securely fix the support to the first plate.

21 Claims, 10 Drawing Sheets

(51) Int. Cl.
*F04D 29/02* (2006.01)
*F04D 29/64* (2006.01)
*G06F 1/20* (2006.01)

(52) U.S. Cl.
CPC ...... *F05D 2230/54* (2013.01); *F05D 2260/30* (2013.01); *F05D 2300/43* (2013.01)

(56) References Cited

U.S. PATENT DOCUMENTS

| | | |
|---|---|---|
| 7,023,116 B2 | 4/2006 | Kuribara |
| 8,267,588 B2 * | 9/2012 | Inazuka .............. B29C 45/0055 264/328.9 |
| 2009/0021087 A1 | 1/2009 | Kitamura et al. |
| 2009/0047148 A1 | 2/2009 | Chen et al. |
| 2012/0235526 A1 * | 9/2012 | Wu ...................... H02K 5/1675 310/90 |

FOREIGN PATENT DOCUMENTS

| | | |
|---|---|---|
| JP | 11-215763 A | 8/1999 |
| JP | 11-215764 A | 8/1999 |
| JP | 2000-090527 A | 3/2000 |
| JP | 2002-143767 A | 5/2002 |
| JP | 2002-143768 A | 5/2002 |
| JP | 2002-325413 A | 11/2002 |
| JP | 2003-111316 A | 4/2003 |
| JP | 2004-007999 A | 1/2004 |
| JP | 2004-146056 A | 5/2004 |

\* cited by examiner

CASING AND BLOWER

BACKGROUND OF THE INVENTION

1. Field of the Invention

The present invention relates to a casing and a blower.

2. Description of the Related Art

Blowers used for internal cooling have often been installed in electronic devices, such as notebook personal computers. Such a blower includes a centrifugal impeller, a motor arranged to rotate the impeller, and a casing arranged to accommodate the impeller and the motor. Once the motor of the blower is driven, the impeller is caused to rotate to generate an air current inside an electronic device. The blower thus dissipates heat radiating from an electronic component, such as a CPU, installed inside the electronic device.

The casing of the blower of this type includes a pair of plates and a support arranged to join these plates to each other. The support may be defined on one of the plates by resin outsert molding in order to achieve a reduction in weight or a shortening of a manufacturing process. In this case, it is necessary to securely fix the support to the plate.

A technique for increasing the strength with which a plate and a part made of a resin are fixed to each other in the case where the part made of the resin is defined on the plate by outsert molding is described, for example, in JP-UM-A H07-036586. According to the technique described in JP-UM-A H07-036586, a plurality of projections are cut and bent upward from a stator base, and a bearing holder made of a resin is defined integrally with the stator base so as to embrace the projections (see, for example, claim 1 and FIGS. 1, 2, and 3 of JP-UM-A H07-036586).

However, there is a very strong demand for miniaturization of electronic devices such as notebook personal computers, and in addition, there is a demand for wider air channels inside casings of blowers. When these demands are satisfied, an area in which a support can be arranged on a plate is small, and it is therefore difficult to cut and bend a plurality of projections as mentioned above upward from the plate. In addition, it is also difficult to increase the length of each individual projection cut and bent upward from the plate.

Such problems occur not only in the case of the casings used in the blowers but also in the case of casings used in other applications, when the area in which the support can be arranged is small.

SUMMARY OF THE INVENTION

A casing according to a preferred embodiment of the present invention includes a first plate made of a metal; a support made of a resin, including a screw hole, fixed to the first plate, and extending in a direction away from the first plate; and a second plate fixed to the support through a screw fitted into the screw hole. It is assumed that a direction along a central axis of the screw hole is a central axis direction, that a side on which the second plate is arranged with respect to the first plate is an upper side with respect to the central axis direction, and that a side on which the first plate is arranged with respect to the second plate is a lower side with respect to the central axis direction. The first plate includes a flat plate portion extending perpendicularly or substantially perpendicularly to the central axis direction; a through hole passing through the flat plate portion; and a claw portion extending upward with respect to the central axis direction from an edge of the flat plate portion which defines the through hole. The claw portion is defined by a portion of the first plate extending along a direction along which a longest line segment is taken inside the through hole in a plan view and being bent upward from the flat plate portion. A portion of the support is arranged in the through hole. The support is arranged to cover at least a portion of the claw portion.

According to the above preferred embodiment of the present invention, the support is prevented from turning and from coming off in an upward direction by being engaged with the claw portion. In addition, even in the case where an area in which the support is provided in the casing is small, the claw portion is able to have a great length. This enables the support to be securely fixed to the first plate.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a direction parallel to a rotation axis of a motor is referred to by the term "rotation axis direction", that directions perpendicular to the rotation axis of the motor are referred to by the term "radial direction", "radial", or "radially", and that a direction along a circular arc centered on the rotation axis of the motor is referred to by the term "circumferential direction", "circumferential", or "circumferentially". Note, however, that the term "parallel" as used above and as used in the following description comprehends both "parallel" and "substantially parallel" directions. Also note that the term "perpendicular" as used above and as used in the following description comprehends both "perpendicular" and "substantially perpendicular" directions.

It is also assumed herein that a direction along a central axis of a screw hole of a support is referred to by the term "central axis direction". In preferred embodiments of the present invention described below, a "rotation axis direction" and a "central axis direction" are parallel to each other. It is also assumed that a side on which a second plate is arranged with respect to a first plate is an upper side with respect to the central axis direction, and that a side on which the first plate is arranged with respect to the second plate is a lower side with respect to the central axis direction. Note, however, that the above definitions of the upper and lower sides are not meant to restrict in any way the orientation of a casing or a blower according to any preferred embodiment of the present invention when in use. Also note that the rotation axis direction and the central axis direction may not necessarily be parallel to each other.

Figure 1:
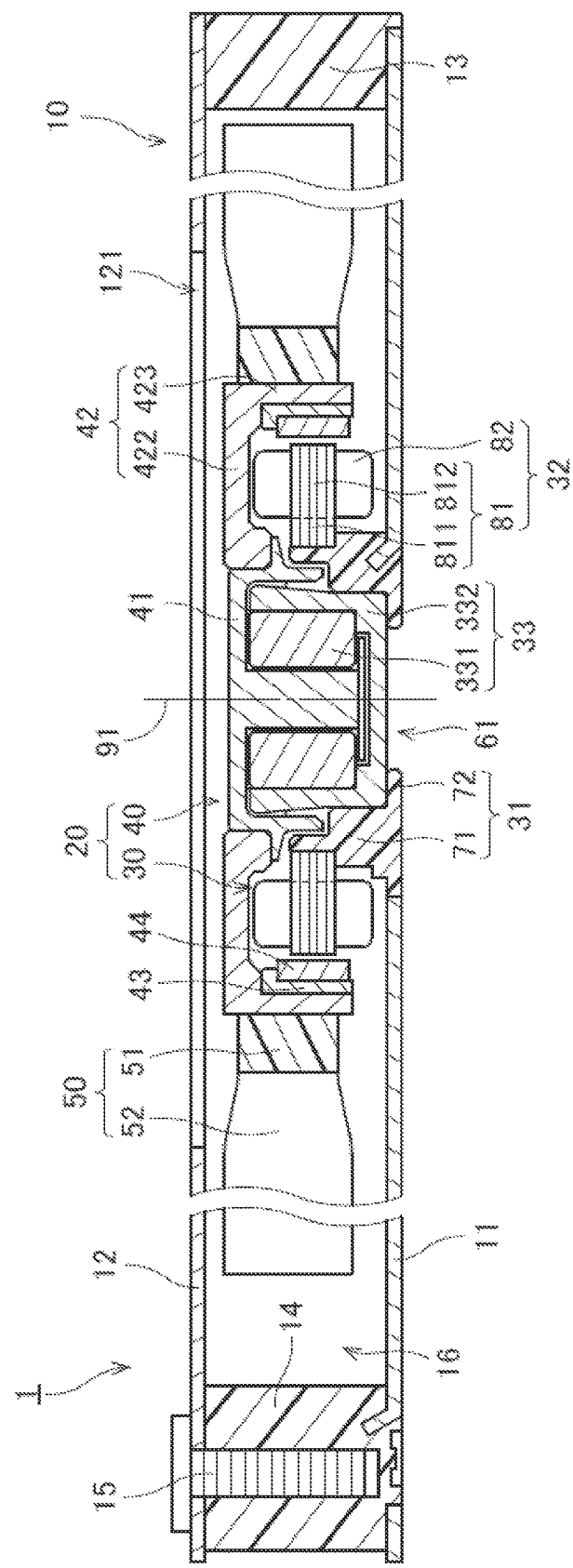
FIG. 1 is a schematic cross-sectional view of a blower according to a preferred embodiment of the present invention.

FIG. 1 is a schematic cross-sectional view of a blower 1 according to a preferred embodiment of the present invention. The blower 1 is preferably installed in an electronic device, such as, for example, a notebook personal computer or a tablet personal computer, and is used to generate an air current to cool an interior of the electronic device. Note, however, that blowers according to preferred embodiments of the present invention may also be used for generating an air current for purposes other than cooling. Also note that blowers according to preferred embodiments of the present invention may be used in household electrical appliances other than personal computers, such as, for example, transportation equipment, automobiles, medical appliances, and any or all other applications.

Referring to FIG. 1, the blower 1 according to the present preferred embodiment includes a casing 10, a motor 20, and an impeller 50.

The casing 10 is a case arranged to accommodate a rotating portion 40 of the motor 20 and the impeller 50 therein. The casing 10 preferably includes a base plate 11, which is an example of a first plate, a cover 12, which is an example of a second plate, a side wall 13, and a support 14. The support 14 includes a screw hole, is fixed to the base plate 11, and is arranged to extend in a direction away from the base plate 11. Each of the base plate 11 and the cover 12 is defined preferably by subjecting a flat metal sheet to a stamping process or press working, for example. The base plate 11 is arranged to be perpendicular to a rotation axis 91. The cover 12 is arranged above the base plate 11 and parallel to the base plate 11. An upper surface of the base plate 11 and a lower surface of the cover 12 are opposed to each other. An aluminum alloy or a galvanized steel sheet, for example, is preferably used as a material of each of the base plate 11 and the cover 12.

The cover 12 includes an air hole 121 through which a gas is taken into the casing 10. The air hole 121 is arranged to pass through the cover 12 in the rotation axis direction above the motor 20 and the impeller 50. Moreover, the air hole 121 is circular or substantially circular in a plan view, and is arranged to be substantially coaxial with the rotation axis 91 of the motor 20.

Each of the side wall 13 and the support 14 is preferably defined on the base plate 11 by a resin injection molding process. The side wall 13 is arranged to extend upward from the base plate 11 and also along an edge portion of the base plate 11. The support 14 is arranged to extend upward from the upper surface of the base plate 11 in the vicinity of the edge portion of the base plate 11. An upper surface of each of the side wall 13 and the support 14 is arranged to be in contact with the lower surface of the cover 12. In addition, the support 14 is preferably fixed to the cover 12 through a fastener, such as, for example, a screw 15.

The motor 20 is arranged to produce a torque in accordance with drive currents to rotate the impeller 50. The motor 20 includes a stationary portion 30 and the rotating portion 40. The stationary portion 30 is stationary relative to the casing 10. The rotating portion 40 is supported so as to be rotatable with respect to the stationary portion 30.

The stationary portion 30 according to the present preferred embodiment preferably includes a holder 31, a stator 32, and a stationary bearing portion 33.

The holder 31 is defined on the base plate 11 preferably by a resin injection molding process. The base plate 11 preferably includes a first through hole 61 arranged to be coaxial or substantially coaxial with the rotation axis 91. The holder 31 preferably includes a tubular portion 71 extending upward from a vicinity of a periphery of the first through hole 61, and a bottom plate portion 72 extending in an annular shape in the first through hole 61. Both the tubular portion 71 and the bottom plate portion 72 annularly surround the rotation axis 91.

The stator 32 preferably includes a stator core 81 and a plurality of coils 82. The stator core 81 preferably is defined, for example, by laminated steel sheets. The stator core includes an annular core back 811 and a plurality of teeth 812. The core back 811 is preferably fixed to an outer circumferential surface of the tubular portion 71 of the holder through, for example, an adhesive. The teeth 812 extend radially outward from the core back 811 in a radial manner. Each coil 82 is defined by a conducting wire wound around a separate one of the teeth 812. Both the teeth 812 and the coils 82 are arranged at regular or substantially at regular intervals in a circumferential direction around the rotation axis 91.

The stationary bearing portion 33 is supported by the holder 31. The stationary bearing portion 33 includes a cylindrical or substantially cylindrical sleeve 331. A portion of a shaft portion 41, which extends in a vertical direction along the rotation axis 91, is accommodated inside the sleeve 331. An inner circumferential surface of the sleeve 331 and an outer circumferential surface of the shaft portion 41 are arranged radially opposite each other with a slight gap intervening therebetween. In addition, a lubricating fluid is arranged in the gap between the inner circumferential surface of the sleeve 331 and the outer circumferential surface of the shaft portion 41. A fluid dynamic bearing is thus defined. The rotating portion 40 is rotatably supported by the stationary bearing portion 33. A polyolester oil or a diester oil, for example, is preferably used as the lubricating fluid. Note, however, that a bearing of another type, such as, for example, a plain bearing, a sintered bearing, a ball bearing, etc., may be used in place of the fluid dynamic bearing.

The rotating portion 40 according to the present preferred embodiment preferably includes the shaft portion 41, a rotor portion 42, and the impeller 50, which is preferably a centrifugal impeller.

The rotor portion 42 preferably includes a rotor holder 422, a yoke 43, and a magnet 44. The rotor holder 422 extends radially outward from an upper portion of the shaft portion 41. The rotor portion 42 preferably further includes a yoke holding portion 423 arranged radially outside the stator 32, joined to the rotor holder 422, and extending downward in the rotation axis direction so as to substantially assume the shape of a cylinder.

The yoke 43 is an annular magnetic body. The yoke 43 is fixed to the yoke holding portion 423 radially outside the stator 32. The magnet 44 is fixed to an inner circumferential surface of the yoke 43.

The impeller 50 preferably includes an impeller cup 51 and a plurality of blades 52. The impeller cup 51 is cylindrical or substantially cylindrical, and is arranged radially opposite the yoke holding portion 423. An inner circumferential surface of the impeller cup 51 is fixed to an outer circumferential surface of the yoke holding portion 423. Each blade 52 extends radially outward from an outer circumferential surface of the impeller cup 51. Each blade 52 is arranged above the base plate and below the cover 12. In addition, the blades 52 are preferably arranged at regular or substantially regular intervals in the circumferential direction.

According to the present preferred embodiment, the shaft portion 41, the rotor portion 42, and the impeller 50 are defined integrally with one another as a single monolithic member. Note, however, that any two or more of the shaft portion 41, the rotor portion 42, and the impeller 50 may alternatively be defined by separate members if so desired. For example, the rotor portion and the shaft portion may be defined by separate members, with the upper portion of the shaft portion fixed in a through hole defined in a center of the rotor portion through adhesion or press fit. Also note that each of the shaft portion 41, the rotor portion 42, and the impeller 50 may be defined by a plurality of members.

Once the drive currents are supplied to the coils 82 of the stator 32, magnetic flux is generated around each of the teeth 812 of the stator core 81. Then, a circumferential torque is produced by interaction between the magnetic flux of the teeth 812 and that of the magnet 44, so that the rotating portion 40 including the impeller 50 is caused to rotate about the rotation axis 91. Rotation of the impeller 50 causes gas to be taken from a space above the casing 10 into the casing 10 through the air hole 121. In addition, the gas taken into the casing 10 receives a centrifugal force caused by the impeller 50, and is discharged laterally out of the casing 10 through an air channel 16 inside the casing 10.

Figure 2:
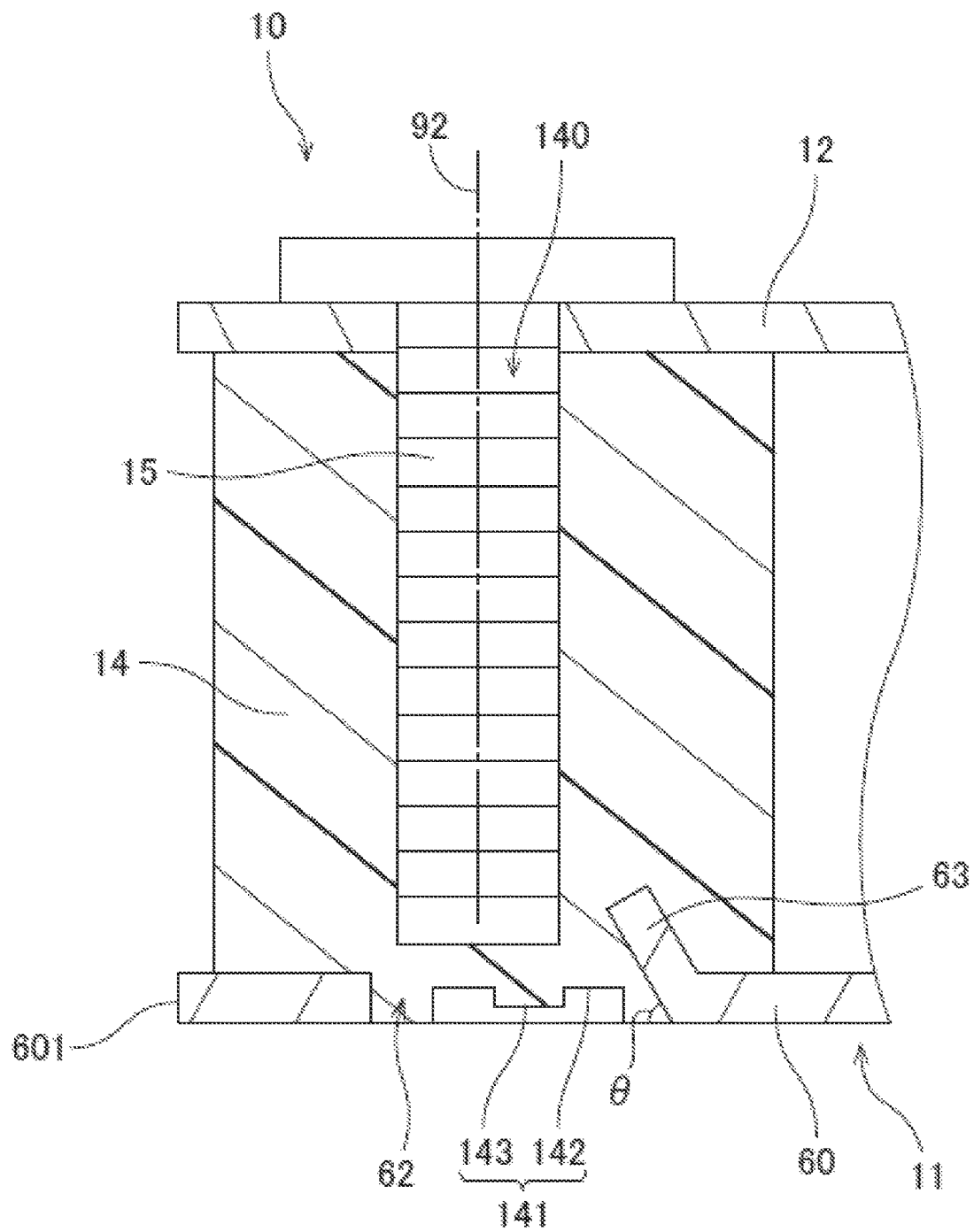
FIG. 2 is a schematic cross-sectional view of a casing according to a preferred embodiment of the present invention, illustrating a support and its vicinity.
Figure 3:
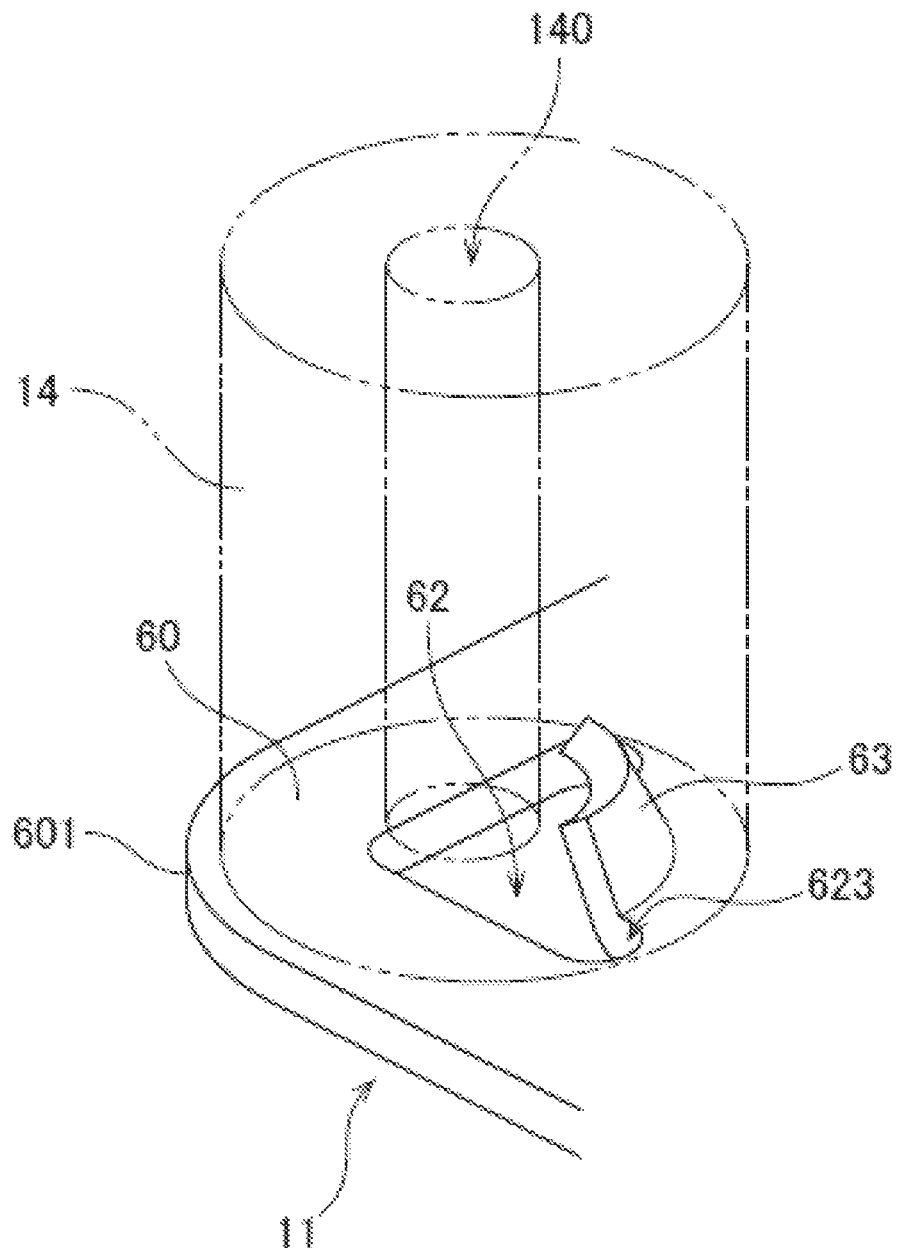
FIG. 3 is a schematic perspective view of a base plate according to a preferred embodiment of the present invention, illustrating the support and its vicinity.
Figure 4:
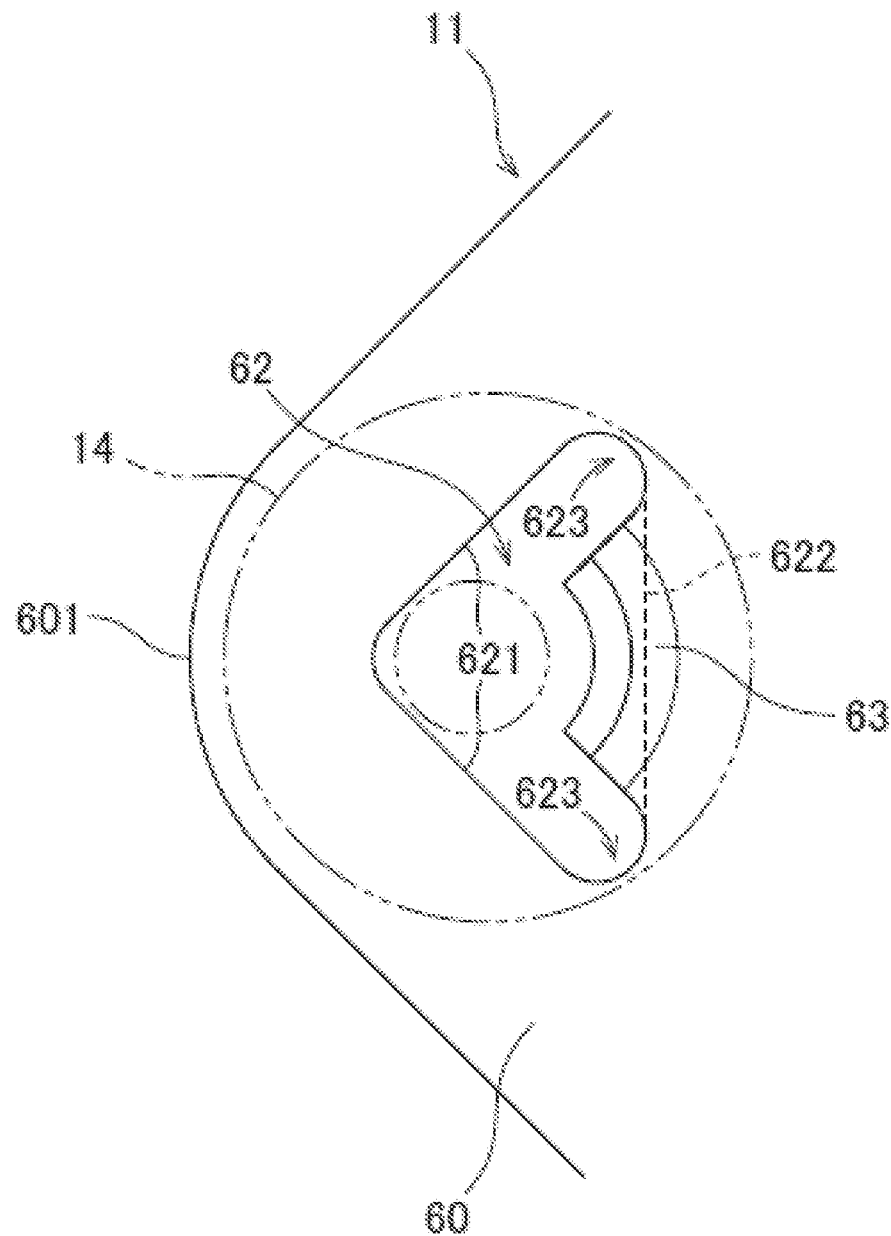
FIG. 4 is a schematic top view of the base plate, illustrating the support and its vicinity.
Figure 5:
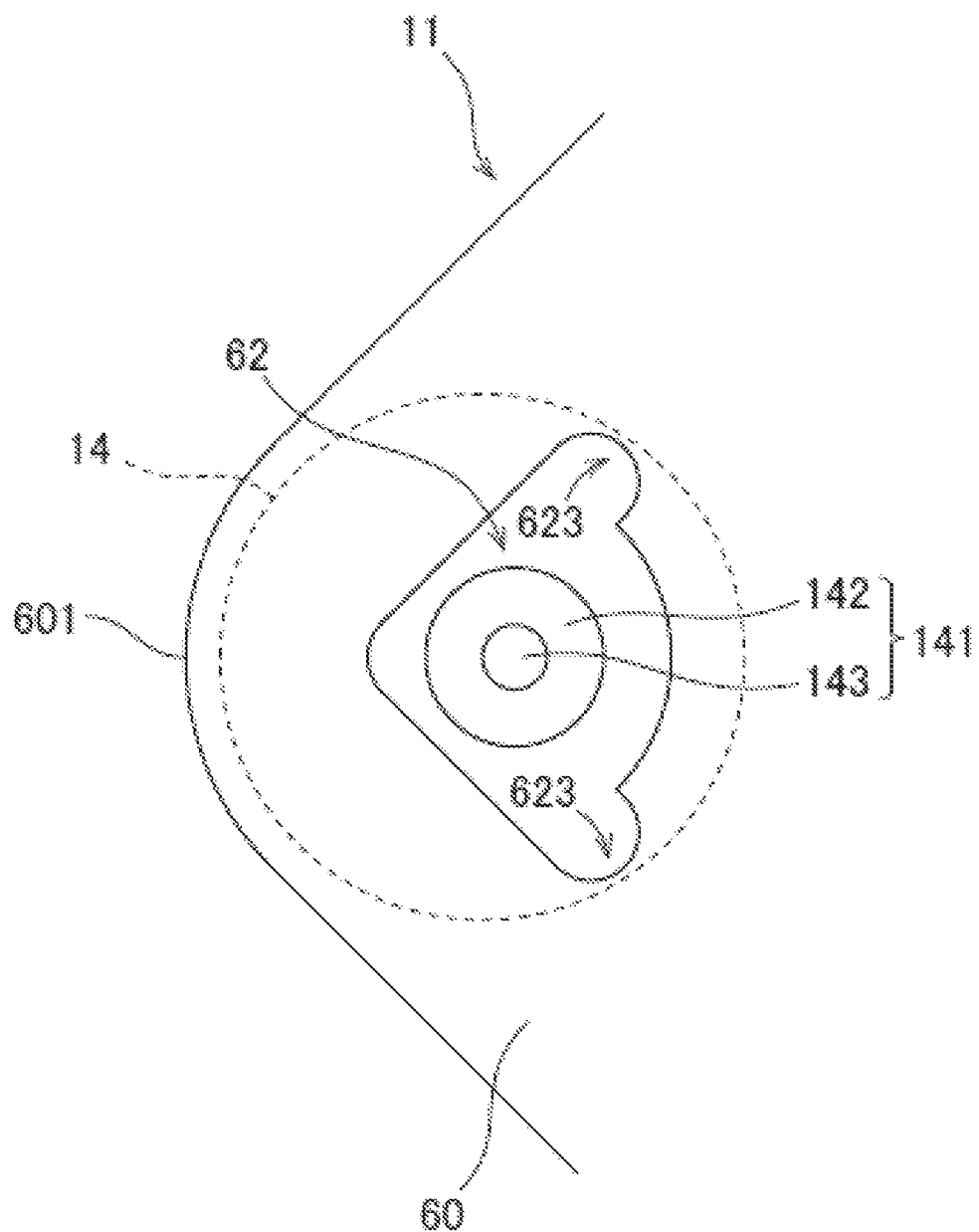
FIG. 5 is a schematic bottom view of the casing, illustrating the support and its vicinity.

Next, the structure of the support 14 and its vicinity will now be described in more detail below. FIG. 2 is a schematic vertical cross-sectional view of the casing 10, illustrating the support 14 and its vicinity. FIG. 3 is a schematic perspective view of the base plate 11, illustrating the support 14 and its vicinity. FIG. 4 is a schematic top view of the base plate 11, illustrating the support 14 and its vicinity. FIG. 5 is a schematic bottom view of the casing 10, illustrating the support 14 and its vicinity. Note that, in each of FIGS. 3 and 4, the shape of the support 14 is represented by chain double-dashed lines.

Referring to FIGS. 2 to 5, the base plate 11 according to the present preferred embodiment preferably includes a flat plate portion 60, a second through hole 62, and a claw portion 63. The flat plate portion 60 extends perpendicularly to the central axis direction. Referring to FIGS. 3 to 5, a corner edge 601, which is angular or substantially angular in a plan view, is arranged at a corner of the flat plate portion 60. The second through hole 62 is arranged to pass through the flat plate portion 60 in the central axis direction in the vicinity of the corner edge 601. According to the present preferred embodiment, the second through hole 62 is preferably in or substantially in the shape of an isosceles right triangle in the plan view. Within an edge portion of the flat plate portion 60 which defines the second through hole 62, edges 621 corresponding to a pair of equal sides of the isosceles right triangle are arranged to be in parallel with, respectively, two sides of the flat plate portion 60 which together define the corner edge 601.

The base plate 11 according to the present preferred embodiment includes only one claw portion 63 within a region of the second through hole 62 in the plan view. The claw portion 63 extends from an edge 622, which corresponds to a base of the isosceles right triangle, within the edge portion of the flat plate portion 60 which defines the second through hole 62, obliquely upward with respect to the central axis direction away from the flat plate portion 60 and toward the region of the second through hole 62 in the plan view. When the base plate 11 is produced, a metal piece extending from the edge 622 of the flat plate portion 60 toward a vertex opposed to the base of the isosceles right triangle is preferably plastically deformed by, for example, press working, and is bent upward with respect to the central axis direction. Then, the metal piece being bent upward becomes the claw portion 63.

When only one claw portion 63 is defined within the region of the second through hole 62 in the plan view as described above, the claw portion 63 is able to have a greater width and a greater length than in the case where a plurality of claw portions are defined within the same region.

The support 14 is columnar or substantially columnar, and extends upward from a portion of the base plate 11, the portion including the second through hole 62. A screw hole 140 is defined in the support 14. At least a portion of the screw hole 140 and at least a portion of the claw portion 63 are arranged at the same axial position. The screw hole 140 according to the present preferred embodiment includes an opening in an upper end surface of the support 14, and extends from the upper end surface of the support 14 downward in the central axis direction. The screw hole 140 does not pass through the support 14 up to a lower surface of the support 14. Note, however, that the screw hole 140 may be arranged to pass through the support 14 in order to increase the length of the screw hole 140 as measured in the central axis direction. The screw hole 140 is circular or substantially circular in the plan view. When the casing 10 is constructed, the screw 15 is inserted into the screw hole 140 of the support 14 to fix the cover 12.

Note that the support may not necessarily be columnar or substantially columnar in shape. For example, the external shape of the support may alternatively be in the shape of a polygonal prism.

The support 14 is preferably defined by, for example, so-called outsert molding. Specifically, a portion of the base plate 11 is arranged in a mold, and a resin is injected into a cavity in the mold and is cured. When the outsert molding is performed, a portion of the resin which defines the support 14 is poured into the second through hole 62. Accordingly, a portion of the molded support 14 is arranged in the second through hole 62. The second through hole 62 is not in the shape of a perfect circle and coaxial with a central axis 92 of the screw hole 140. In addition, according to the present preferred embodiment, the entire second through hole 62 is preferably filled with the resin. Therefore, a portion of the support 14 is in contact with the edge portion of the base plate 11 which defines the second through hole 62. In the case where a portion of the support 14 is provided in the second through hole 62 as described above, when a force acting in a circumferential direction about the central axis 92 is exerted on the support 14, a reaction force is applied from the edge portion of the base plate 11 which defines the second through hole 62 to the support 14. This contributes to preventing the support 14 from turning around the central axis 92.

In addition, the claw portion 63 of the base plate 11 is covered with the resin which defines the support 14. Accordingly, the resin is arranged to be in contact with both end portions of the claw portion 63 in the circumferential direction about the central axis 92. This contributes to more effectively preventing the support 14 from turning around the central axis 92.

When the screw 15 is inserted into the screw hole 140 of the support 14 while turning the screw 15, a load acting in the circumferential direction about the central axis 92 is exerted on the support 14. However, the support 14 according to the present preferred embodiment is engaged with both the second through hole 62 and the claw portion 63 as described above. Thus, the strength with which the support 14 is fixed to the base plate 11 in the circumferential direction about the central axis 92 is increased. As a result, the support 14 is prevented from turning together with the screw 15.

In addition, a portion of the resin which defines the support 14 is arranged on the lower side of the claw portion 63 with respect to the central axis direction. Accordingly, the resin is in contact with a surface of the claw portion 63 which faces obliquely downward. Therefore, when a force acting upward with respect to the central axis direction is exerted on the support 14, a portion of the support 14 receives from the claw portion 63 a reaction force acting downward with respect to the central axis direction. As a result, the support 14 is prevented from coming off upwardly in the central axis direction. As described above, the claw portion 63 according to the present preferred embodiment is configured to provide both a function of preventing the support 14 from turning around the central axis 92, and a function of preventing the support 14 from coming off upwardly in the central axis direction.

In particular, the claw portion 63 according to the present preferred embodiment extends not perpendicularly but obliquely upward from the edge 622 of the second through hole 62. In this case, a portion of the resin which defines the support 14 is located on the lower side of the claw portion 63 with respect to the central axis direction even when the shape of the claw portion 63 itself does not have an uneven portion. Thus, it is possible to prevent the support 14 from coming off upwardly in the central axis direction without complicating the shape of the claw portion 63.

Referring to FIG. 2, an angle θ at which the claw portion 63 is bent upward with respect to the flat plate portion is preferably any angle greater than 0 degrees and smaller than 90 degrees. Note, however, that the closer the angle θ is to 90 degrees, the less effectively the support 14 is prevented from coming off upwardly in the central axis direction. Meanwhile, if the angle θ is too small, the claw portion 63 will occupy too large an area in the plan view. In order to prevent the support 14 from coming off using a small space, the angle θ is preferably arranged to be greater than about 45 degrees and smaller than about 75 degrees, for example. More preferably, the angle θ is arranged to be greater than about 50 degrees and smaller than about 70 degrees, for example.

Since the support 14 according to the present preferred embodiment includes the screw hole 140, the support 14 includes a tubular or substantially tubular portion arranged to extend in the central axis direction. In addition, referring to FIGS. 3 and 4, a top portion of the claw portion 63 preferably has a circular or substantially circular arc shape along a circumference of the screw hole 140. That is, the top portion of the claw portion 63 has a circular or substantially circular arc shape, and is concentric or substantially concentric with the tubular portion of the support 14. This arrangement prevents the top portion of the claw portion 63 from being exposed in the screw hole 140 or out of the support 14, and allows the top portion of the claw portion 63 to have a large dimension as measured in the circumferential direction about the central axis 92. This contributes to increasing the area of contact between the claw portion 63 and the support 14. This in turn enables the claw portion 63 to more effectively prevent the turning and the coming off of the support 14.

Further, according to the present preferred embodiment, not only the top portion of the claw portion 63 but the entire claw portion 63 preferably has a circular or substantially circular arc shape along the circumference of the screw hole 140. That is, the entire claw portion 63 preferably has a circular or substantially circular arc shape, and is concentric or substantially concentric with the tubular portion of the support 14. This arrangement prevents the claw portion 63 from being exposed in the screw hole 140 or out of the support 14, and allows the entire claw portion 63 to have a large dimension as measured in the circumferential direction about the central axis 92. This contributes to further increasing the area of contact between the claw portion 63 and the support 14. This in turn enables the claw portion 63 to more effectively prevent the turning and the coming off of the support 14.

Note that, according to the present preferred embodiment, the central axis 92 of the screw hole 140 is slightly displaced from a center of the support 14 toward the corner edge 601. That is, the central axis 92 of the screw hole 140 is displaced to a side opposite to a side on which the claw portion 63 is provided. This arrangement makes it possible to secure a larger space in which the claw portion 63 is to be arranged within the support 14. This prevents the claw portion 63 from being exposed in the screw hole 140 or out of the support 14, and enables the claw portion 63 to have a larger dimension as measured in the circumferential direction about the central axis 92. This contributes to further increasing the area of contact between the claw portion 63 and the support 14. This in turn enables the claw portion 63 to more effectively prevent the turning and the coming off of the support 14.

In addition, according to the present preferred embodiment, a portion of the screw hole 140 in the vicinity of a lower end thereof and a portion of the claw portion 63 in the vicinity of a top thereof are preferably arranged at the same axial level. That is, at least a portion of the screw hole 140 and at least a portion of the claw portion 63 are arranged at the same position with respect to the central axis direction. When the screw 15 is inserted into the screw hole 140 while being turned, the screw hole 140 is expanded, and a portion of the resin around the screw hole 140 is compressed. A stress acting toward the claw portion 63 is applied to a portion of the resin arranged between the screw hole 140 and the claw portion 63 as a result of fitting of the screw 15. The portion of the resin around the screw hole 140 of the support 14 is thus pressed onto the claw portion 63. This enables the claw portion 63 to more effectively prevent the turning and the coming off of the support 14.

In particular, according to the present preferred embodiment, a self-tapping screw is preferably used as the screw 15. Accordingly, no female threads are defined in the screw hole 140 according to the present preferred embodiment. In this case, when the screw 15 is fitted into the screw hole 140, the portion of the resin around the screw hole 140 is more strongly pressed onto the claw portion 63. This enables the claw portion 63 to more effectively prevent the turning and the coming off of the support 14. Note, however, that female threads may be defined in the screw hole 140, and that the screw 15 may be inserted into the screw hole 140 while being turned in accordance with the female threads.

In addition, according to the present preferred embodiment, the second through hole 62 preferably includes a pair of cuts 623 defined on both sides of a base portion of the claw portion 63. Each of the pair of cuts 623 is recessed in a direction away from the central axis 92 relative to the base portion of the claw portion 63, and passes through the flat plate portion 60 in the central axis direction. In the case where the pair of cuts 623 are arranged on both sides of the claw portion 63 as described above, a deformation of the base plate 11 which may occur in the vicinity of the base portion of the claw portion 63 when the claw portion 63 of the base plate 11 is bent upward is significantly reduced or prevented.

In addition, according to the present preferred embodiment, the second through hole 62 is preferably located in the vicinity of the corner edge 601 of the base plate 11. Therefore, a portion of the base plate 11 on a side of the second through hole 62 closer to the corner edge 601 is less rigid than a portion of the base plate 11 on a central side of the second through hole 62. According to the present preferred embodiment, the metal piece extending from the edge 622, which is on the central side of the second through hole 62, where the base plate 11 has a greater rigidity, within the edge portion of the flat plate portion 60 which defines the second through hole 62 is bent upward from the edge 622 and becomes the claw portion 63. Thus, the claw portion 63 is able to have a greater strength than in the case where the claw portion 63 extends from either edge 621, which is on the side of the second through hole 62 closer to the corner edge 601. Moreover, the deformation of the base plate 11 which may occur when the claw portion 63 is bent upward is significantly reduced or prevented.

Figure 6:
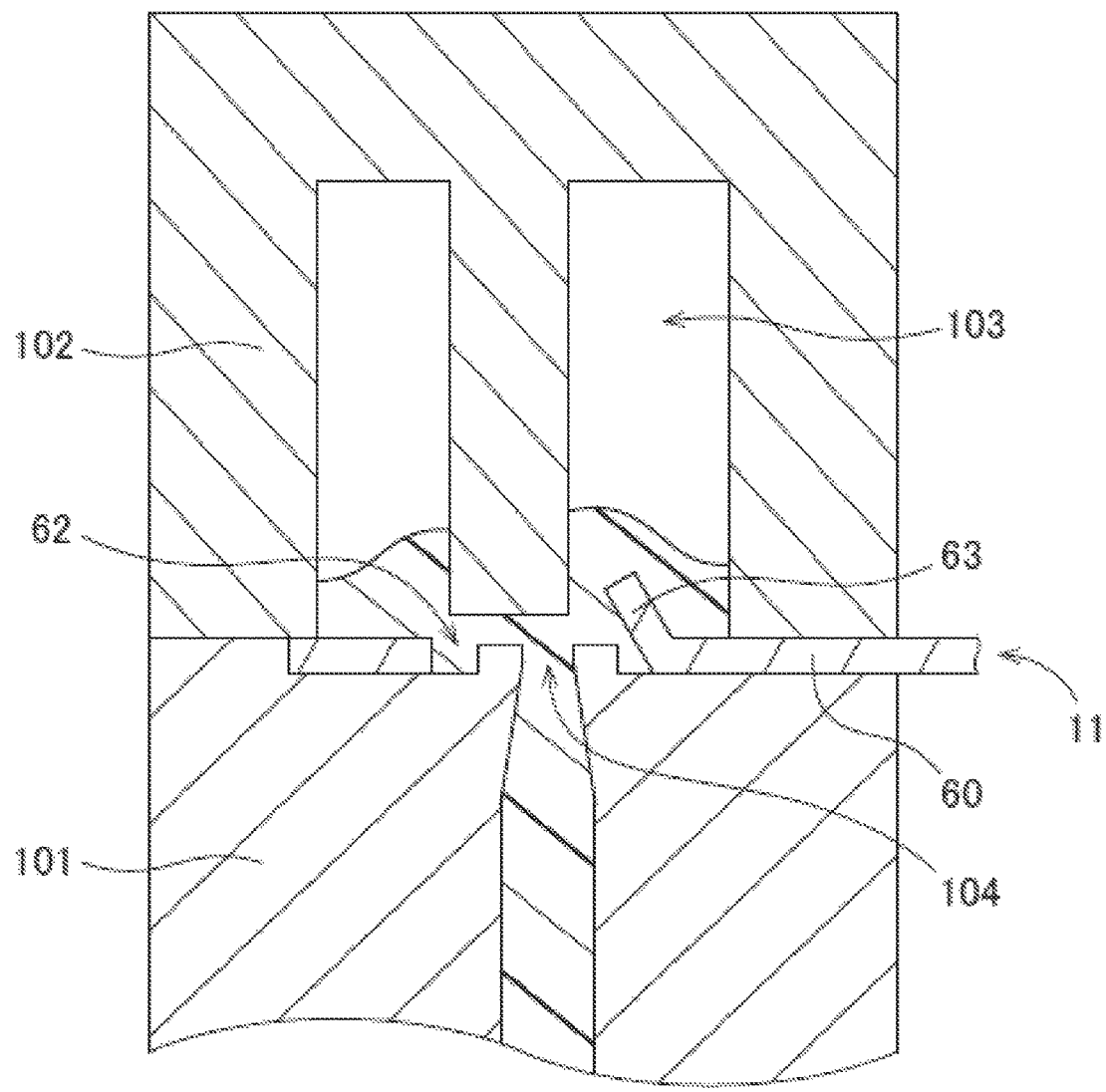
FIG. 6 is a schematic diagram illustrating how the support is molded by outsert molding.

FIG. 6 is a schematic diagram illustrating how the support 14 is preferably molded by outsert molding. When the support 14 is produced by the outsert molding, a fixed mold 101, a movable mold 102, and the base plate 11 are first prepared. The second through hole 62 and the claw portion 63 are previously defined in the base plate 11 by press working or the like.

Next, the base plate 11 is placed on the fixed mold 101, and the movable mold 102 is brought into contact with the upper surface of the base plate 11. The fixed mold 101 and the movable mold 102 are arranged one above the other with the second through hole 62 of the base plate 11 arranged therebetween. As a result, a cavity 103, i.e., a closed interior space, is defined by the fixed mold 101, the movable mold 102, and the base plate 11.

Next, a molten resin is injected into the cavity 103. The molten resin is injected into the cavity 103 through a gate 104 defined in the fixed mold 101. A mouth of the gate 104 is located in the second through hole 62 of the base plate 11. The injected molten resin spreads upward from the second through hole 62, and fills the entire cavity 103.

After the molten resin fills the cavity 103, the molten resin is cooled and cured. The molten resin in the cavity 103 is cured to become the support 14. In addition, the base plate 11 and the support 14 are preferably fixed to each other at the same time as the molten resin is cured. Thereafter, the resin inside the gate 104 is cut off, and the movable mold 102 is moved upward to separate the fixed mold 101 and the movable mold 102 from each other. Then, the base plate 11 and the support 14 are released from the mold.

Referring to FIG. 2, the lower surface of the support 14 after being molded is located in the second through hole 62 of the base plate 11. In addition, referring to FIGS. 2 and 5, the lower surface of the support 14 includes a gate mark 141, which is a mark of the gate 104 used in the injection molding process. The gate mark 141 preferably includes an annular recessed portion 142 and a cut-off mark 143 arranged inside of the recessed portion 142. Each of the recessed portion 142 and the cut-off mark 143 is preferably arranged at an axial level higher than that of a lower surface of the flat plate portion 60 of the base plate 11. Accordingly, the resin does not protrude below the lower surface of the flat plate portion 60.

In addition, according to the present preferred embodiment, a portion of the gate mark 141 and a portion of the claw portion 63 are arranged to overlap with each other when viewed in the central axis direction. An area occupied by the gate mark 141 and the claw portion 63 in a plan view is significantly reduced by arranging at least a portion of the gate mark 141 to overlap with the claw portion 63 when viewed in the central axis direction as described above. Both the gate mark 141 and the claw portion 63 are thus able to be provided within the small region of the second through hole 62.

Figure 7:
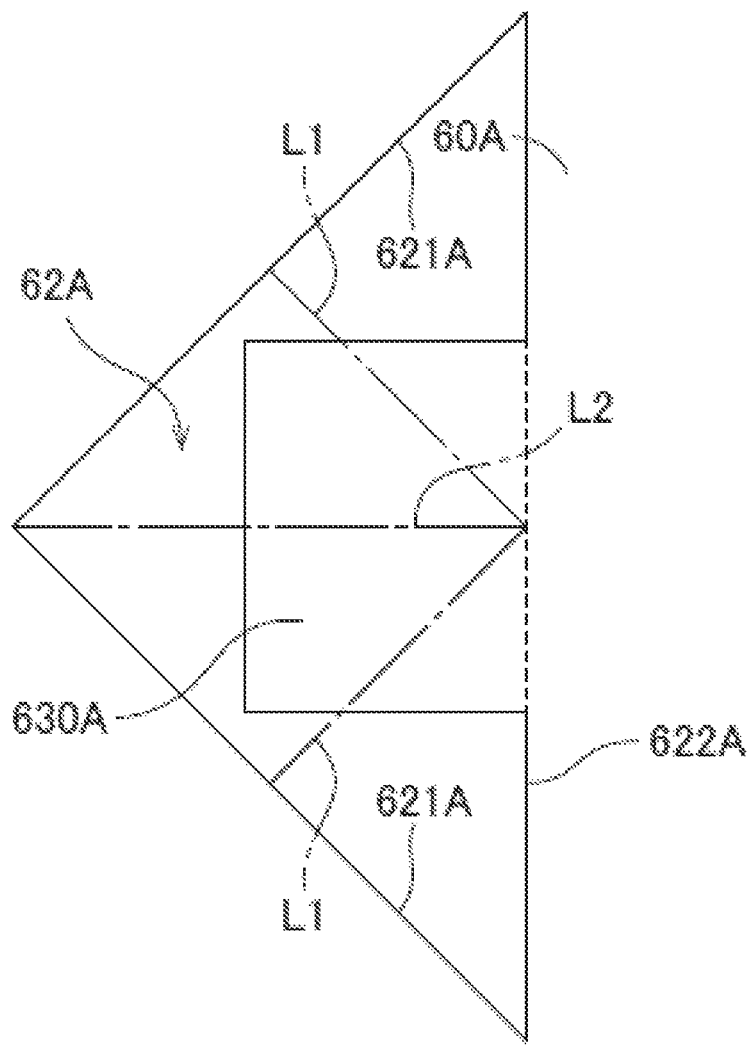
FIG. 7 is a schematic diagram illustrating a second through hole in the shape of an isosceles triangle in a plan view according to a modification of a preferred embodiment of the present invention in a simplified form.

FIG. 7 is a schematic diagram illustrating a second through hole 62A according to a modification of a preferred embodiment of the present invention in a simplified form. The second through hole 62A is preferably in or substantially in the shape of an isosceles triangle in a plan view, and is similar to the second through hole 62 according to the above-described preferred embodiment. In FIG. 7, a line segment L1 is a portion of a perpendicular bisector of each of edges 621A corresponding to a pair of equal sides of the isosceles triangle. End points of the line segment L1 lie on a circumference of the second through hole 62A. A line segment L2 is a portion of a perpendicular bisector of an edge 622A corresponding to a base of the isosceles triangle. End points of the line segment L2 lie on the circumference of the second through hole 62A. In the case of the second through hole 62A, which is in or substantially in the shape of an isosceles triangle, the line segment L2 is longer than each line segment L1.

That is, in the modification illustrated in FIG. 7, a direction along which a maximum line segment is taken inside the second through hole 62A is a direction from a middle point of the edge 622A corresponding to the base of the isosceles triangle to an opposite vertex of the isosceles triangle. That is, the direction along which the maximum line segment is taken is a direction of the line segment L2. In this case, the claw portion is capable of being lengthened when the claw portion is defined by a metal piece 630A extending along the direction of the line segment L2 and being bent upward from the edge 622A, which defines a portion of the second through hole 62A of a flat plate portion 60A. Thus, the claw portion is able to more effectively prevent any turning and coming off of the support even using only a small area of the base plate. Note that the term "maximum line segment" refers to the longest of line segments which are portions of perpendicular bisectors of respective edges of the second through hole and end points of which lie on the circumference of the second through hole in a plan view. The claw portion covers a portion of the maximum line segment in the plan view.

Next, other modifications of various preferred embodiments of the present invention will now be described below with reference to FIGS. 8 and 9. Also in each of these modifications, a metal piece preferably extends along a direction such that the claw portion has the greatest dimension in a second through hole having a different shape. Note that the shape of the second through hole is not limited to a triangle, a quadrilateral, or an ellipse, but may be a circle, a polygon having more than four sides, a closed figure made up of a plurality of arcs, or the like. That is, any appropriate shape of the second through hole may be chosen in accordance with the shape of the base plate.

Figure 8:
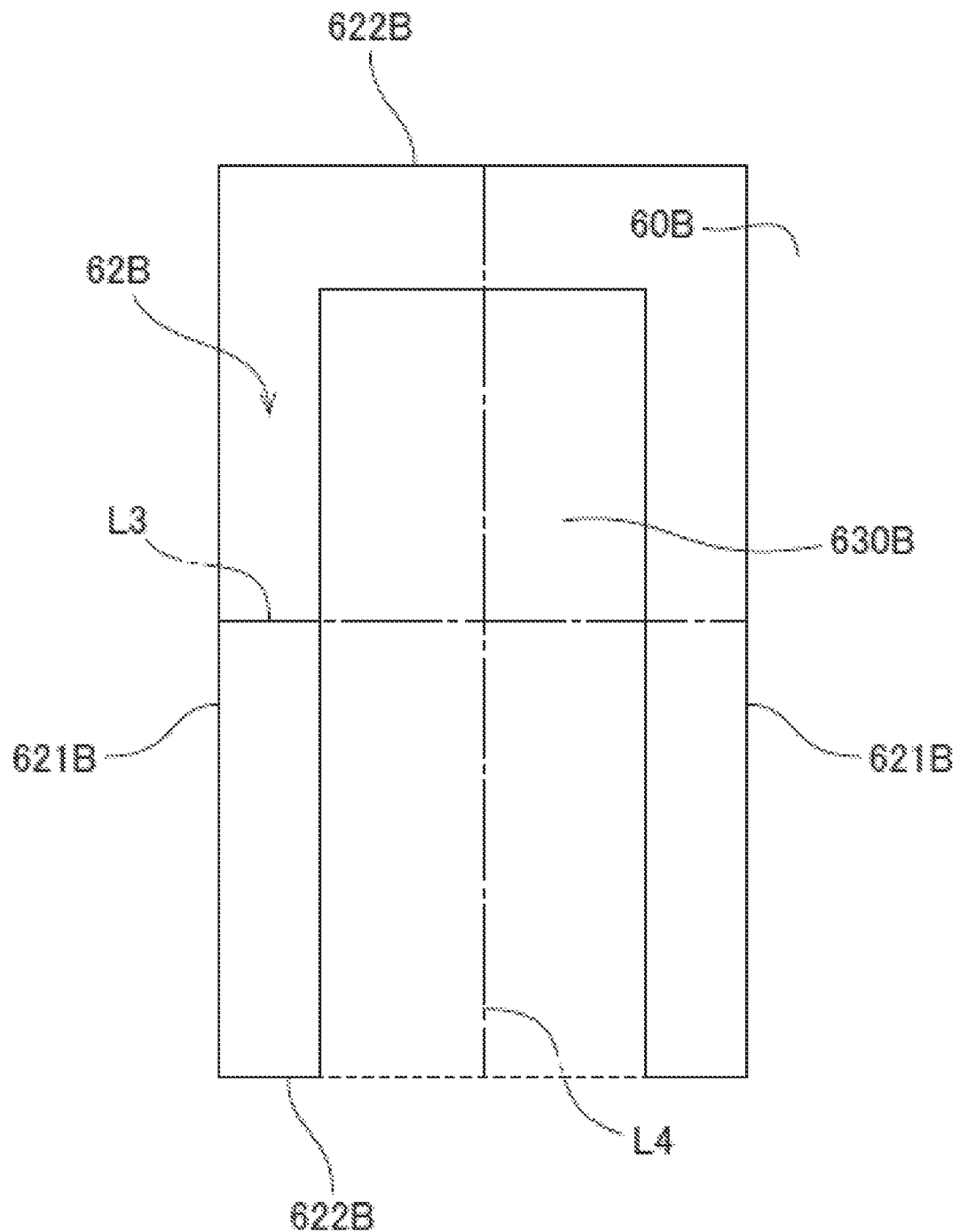
FIG. 8 is a schematic diagram illustrating a second through hole in the shape of a rectangle in a plan view according to a modification of a preferred embodiment of the present invention in a simplified form.

FIG. 8 is a schematic diagram illustrating a second through hole 62B according to a modification of a preferred embodiment of the present invention in a simplified form. The second through hole 62B is preferably in or substantially in the shape of a rectangle in a plan view. In FIG. 8, a line segment L3 is a portion of a perpendicular bisector of each of edges 621B corresponding to long sides of the rectangle. End points of the line segment L3 lie on a circumference of the second through hole 62B. A line segment L4 is a portion of a perpendicular bisector of each of edges 622B corresponding to short sides of the rectangle. End points of the line segment L4 lie on the circumference of the second through hole 62B. In the case of the second through hole 62B, which is rectangular or substantially rectangular, the line segment L4 is longer than the line segment L3.

That is, in the modification illustrated in FIG. 8, a direction along which a maximum line segment is taken inside the second through hole 62B is a direction from a middle point of one of the edges 622B corresponding to one of the short sides of the rectangle to a middle point of the other one of the edges 622B corresponding to the other one of the short sides of the rectangle. That is, the direction along which the maximum line segment is taken is a direction of the line segment L4. In this case, the claw portion is capable of being lengthened when the claw portion is defined by a metal piece 630B extending along the direction of the line segment L4 and being bent upward from one of the edges 622B, which defines a portion of the second through hole 62B of a flat plate portion 60B. Thus, the claw portion is able to more effectively prevent the turning and the coming off of the support even using only a small area of the base plate.

Figure 9:
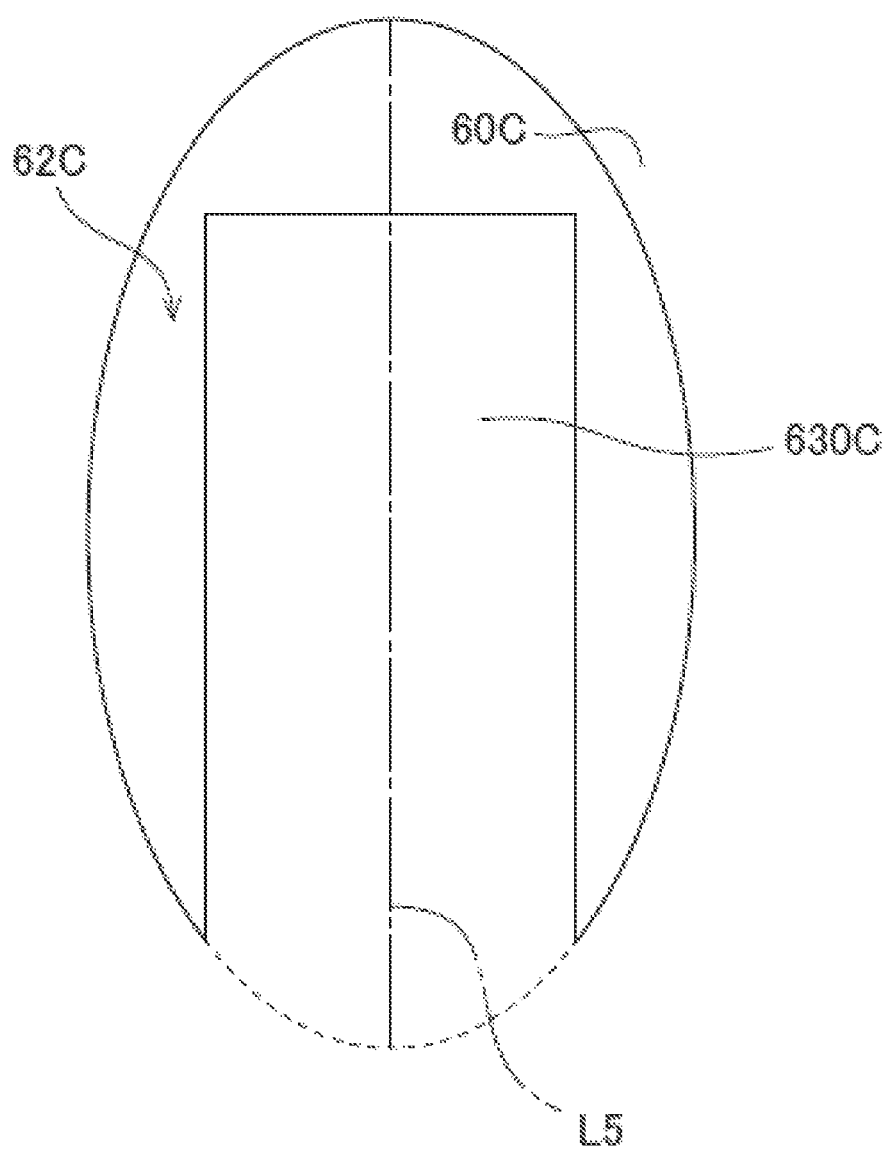
FIG. 9 is a schematic diagram illustrating a second through hole in the shape of an ellipse in a plan view according to a modification of a preferred embodiment of the present invention in a simplified form.

FIG. 9 is a schematic diagram illustrating a second through hole 62C according to a modification of a preferred embodiment of the present invention in a simplified form. The second through hole 62C is in or substantially in the shape of an ellipse in a plan view. In the case where the second through hole 62C is in or substantially in the shape of an ellipse as illustrated in FIG. 9, the ellipse can be regarded as a collection of extremely short sides. Of line segments which are portions of perpendicular bisectors of the respective sides and end points of which lie on a circumference of the second through hole 62C, the longest line segment is a line segment L5 extending along a major axis of the ellipse.

That is, in the modification illustrated in FIG. 9, a direction along which a maximum line segment is taken inside the second through hole 62C is a direction of the major axis of the ellipse. That is, the direction along which the maximum line segment is taken is a direction of the line segment L5. In this case, the claw portion is capable of being lengthened when the claw portion is defined by a metal piece 630C extending along the direction of the line segment L5 and being bent upward from an edge which defines the second through hole 62C of a flat plate portion 60C. Thus, the claw portion is able to more effectively prevent the turning and the coming off of the support even using only a small area of the base plate.

In particular, there is a very strong demand for miniaturization of centrifugal blowers for use in notebook personal computers and tablet personal computers, and in addition, there is a demand for wider air channels inside casings of such centrifugal blowers. When a metal piece extending along a direction along which the longest line segment is taken inside the second through hole is provided and this metal piece is bent upward to define the claw portion as in each of the above-described preferred embodiments and the modifications thereof, the claw portion is able to have a large length within the small region of the second through hole in the plan view. Accordingly, it is possible to increase the strength with which the support is fixed to the base plate through the claw portion while securing a wide air channel inside the casing.

While preferred embodiments of the present invention have been described above, the present invention is not limited to the above-described preferred embodiments.

Figure 10:
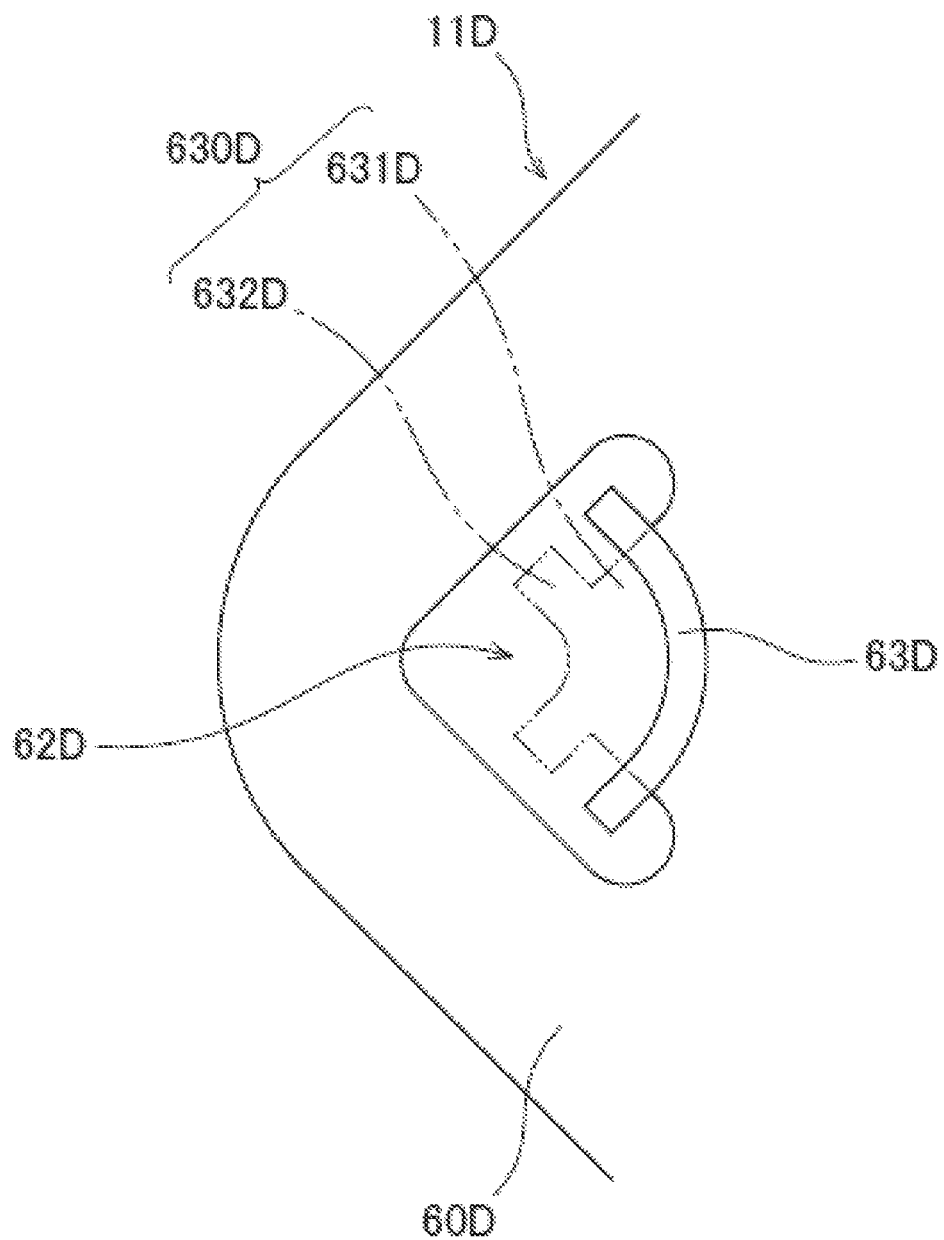
FIG. 10 is a schematic top view of a base plate according to a modification of a preferred embodiment of the present invention.

FIG. 10 is a schematic top view of a base plate 11D according to a modification of a preferred embodiment of the present invention. In the modification illustrated in FIG. 10, a metal piece 630D extending from an edge of a flat plate portion 60D which defines a second through hole 62D toward an interior of the second through hole 62D is bent up perpendicularly to define a claw portion 63D. Therefore, the claw portion 63D illustrated in FIG. 10 is arranged to extend upward with respect to the central axis direction perpendicularly to the flat plate portion 60D. A further reduction in an area occupied by the claw portion 63D in a plan view is achieved by bending the claw portion 63D perpendicularly upward as described above. This makes it possible to reduce the size of a cross section of a support perpendicular to a central axis of the support, and to reduce a space inside the support in which the claw portion 63D is to be accommodated.

In addition, according to the modification illustrated in FIG. 10, the metal piece 630D, which becomes the claw portion 63D, preferably includes a decreased width portion 631D and an increased width portion 632D. After the claw portion 63D is bent upward, the increased width portion 632D is arranged at a level higher than that of the decreased width portion 631D. Assuming that the width of the decreased width portion 631D is a first width, and that the width of the increased width portion 632D is a second width, the second width is greater than the first width. With this arrangement, at least a portion of the support is arranged below a portion of the increased width portion 632D which projects relative to the decreased width portion 631D when the metal piece 630D has been bent upward. This contributes to preventing the support from coming off in an upward direction.

In the case where the claw portion includes the decreased width portion and the increased width portion as described above, coming off of the support in an upward direction is prevented even when the claw portion is bent perpendicularly upward. The claw portion 63D illustrated in FIG. 10 is preferably arranged to have a double-wing shape, with the increased width portion 632D being arranged to project widthwise in both directions relative to the decreased width portion 631D. Note, however, that a claw portion according to another preferred embodiment of the present invention may be arranged to have a single-wing shape, with an increased width portion thereof being arranged to project widthwise in only one direction relative to a decreased width portion thereof. Also note that the increased width portion may not necessarily be arranged in the vicinity of the top portion of the claw portion. Also note that a claw portion according to another preferred embodiment of the present invention may include two or more decreased width portions or two or more increased width portions. Also note that a claw portion according to another preferred embodiment of the present invention may be bent obliquely upward and include a decreased width portion and an increased width portion as described above.

According to the above-described preferred embodiments and modifications thereof, the entire claw portion 63 is preferably buried in the support 14. Note, however, that a portion of the claw portion may protrude out of the support. In short, the support is arranged to cover at least a portion of the claw portion.

Also note that casings according to preferred embodiments of the present invention and modifications thereof may be used for devices other than blowers. For example, various preferred embodiments of the present invention and modifications thereof are applicable to casings of hard disk drives.

Also note that the detailed shape of each of the casing and the blower may be different from the shape thereof as illustrated in the accompanying drawings of the present application.

Also note that features of the above-described preferred embodiments and the modifications thereof may be combined appropriately as long as no conflict arises.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A casing comprising:
   a first plate made of a metal;
   a support made of a resin, including a screw hole, fixed to the first plate, and extending in a direction away from the first plate; and
   a second plate fixed to the support by a screw fitted into the screw hole; wherein
   assuming that a direction along a central axis of the screw hole is a central axis direction, a side on which the second plate is located with respect to the first plate is an upper side with respect to the central axis direction, and a side on which the first plate is located with respect to the second plate is a lower side with respect to the central axis direction;
   the first plate includes:
     a flat plate portion extending perpendicularly or substantially perpendicularly to the central axis direction;
     a through hole passing through the flat plate portion; and
     a claw portion defined by a freestanding projection extending upward with respect to the central axis direction from a circumferential edge of the flat plate portion which defines the through hole;
   the claw portion is defined by a portion of the first plate extending along a direction in which a longest line segment extends inside the through hole in a plan view and being bent upward from the flat plate portion;
   a portion of the support is located in the through hole; and
   at least a portion of the claw portion projects into the through hole and is embedded within the support.

2. The casing according to claim 1, wherein at least a portion of the screw hole and at least a portion of the claw portion are located at a same axial position.

3. The casing according to claim 1, wherein
   the support is made of injection-molded material;
   a lower surface of the support is positioned in the through hole; and
   the lower surface of the support includes a gate mark configured to be used in the injection molding process.

4. The casing according to claim 3, wherein
   the gate mark includes:
     an annular recessed portion; and
     a cut-off mark inside of the recessed portion; and
   the cut-off mark is positioned at an axial level higher than an axial level of a lower surface of the flat plate portion.

5. The casing according to claim 3, wherein at least a portion of the gate mark overlaps with the claw portion when viewed in the central axis direction.

6. The casing according to claim 1, wherein the claw portion extends, from the edge of the flat plate portion which defines the through hole, obliquely upward with respect to the central axis direction away from the flat plate portion and toward the through hole.

7. The casing according to claim 6, wherein the claw portion is bent upward at an angle greater than 45 degrees with respect to the flat plate portion.

8. The casing according to claim 7, wherein
   the support includes a tubular portion extending in the central axis direction; and
   a top portion of the claw portion has a circular or substantially circular arc shape, and is concentric or substantially concentric with the tubular portion of the support.

9. The casing according to claim 8, wherein an entirety of the claw portion has a circular or substantially circular arc shape, and is concentric or substantially concentric with the tubular portion of the support.

10. The casing according to claim 9, wherein the entirety of the claw portion is buried in the support.

11. The casing according to claim 1, wherein the claw portion extends, from the circumferential edge of the flat plate portion which defines the through hole, perpendicularly or substantially perpendicularly upward in the central axis direction.

12. The casing according to claim 11, wherein
    the support includes a tubular portion extending in the central axis direction; and
    a top portion of the claw portion has a circular or substantially circular arc shape, and is concentric or substantially concentric with the tubular portion of the support.

13. The casing according to claim 12, wherein an entirety of the claw portion has a circular or substantially circular arc shape, and is concentric or substantially concentric with the tubular portion of the support.

14. The casing according to claim 13, wherein the entirety of the claw portion is buried in the support.

15. The casing according to claim 11, wherein the claw portion includes:
    a decreased width portion having a first width; and
    at least one increased width portion having a second width greater than the first width, and located on an upper side of the decreased width portion with respect to the central axis direction.

16. The casing according to claim 1, wherein
the through hole is in or substantially in a shape of an isosceles triangle; and
the claw portion is defined by a metal piece extending from a base of the isosceles triangle toward an opposite vertex of the isosceles triangle, and being bent upward from the edge of the flat plate portion which defines the through hole.

17. The casing according to claim 1, wherein
the through hole is in or substantially in a shape of a rectangle; and
the claw portion is defined by a metal piece extending from one short side of the rectangle toward an opposite short side of the rectangle, and being bent upward from the edge of the flat plate portion which defines the through hole.

18. The casing according to claim 1, wherein
the through hole is in or substantially in a shape of an ellipse; and
the claw portion is defined by a metal piece extending along a major axis of the ellipse, and being bent upward from the edge of the flat plate portion which defines the through hole.

19. The casing according to claim 1, wherein
the through hole is located adjacent to an end portion of the first plate; and
the claw portion is defined by a metal piece extending from the circumferential edge of the through hole on a side where a center of the flat plate portion exists toward the end portion, and being bent upward from the edge.

20. The casing according to claim 1, wherein the through hole includes a pair of cuts defined on both sides of the claw portion, each of the pair of cuts being recessed in a direction away from a center of the through hole relative to a base portion of the claw portion.

21. A blower comprising:
the casing of claim 1;
a centrifugal impeller arranged on the upper side of the first plate with respect to the central axis direction and on the lower side of the second plate with respect to the central axis direction; and
a motor configured to rotate the impeller.

* * * * *